United States Patent [19]

Igashira et al.

[11] Patent Number: 4,529,164

[45] Date of Patent: Jul. 16, 1985

[54] PIEZO-TYPE VALVE

[75] Inventors: Toshihiko Igashira, Toyokawa; Yasuyuki Sakakibara, Nishio; Toru Yoshinaga, Okazaki; Seiko Abe, Kariya; Kazuhide Watanabe, Toyohashi, all of Japan

[73] Assignee: Nippon Soken, Inc., Nishio, Japan

[21] Appl. No.: 470,540

[22] Filed: Feb. 28, 1983

[30] Foreign Application Priority Data

| | | | |
|---|---|---|---|
| Mar. 5, 1982 | [JP] | Japan | 57-33778 |
| Mar. 26, 1982 | [JP] | Japan | 57-47334 |

[51] Int. Cl.[3] .......... F16K 31/02

[52] U.S. Cl. .......... 251/129; 251/282; 123/472

[58] Field of Search .......... 251/282, 129; 123/472, 123/477, 478; 367/167; 73/754; 137/625.65

[56] References Cited

U.S. PATENT DOCUMENTS

| | | | |
|---|---|---|---|
| 2,791,237 | 5/1957 | Berninger | 251/282 |
| 4,019,481 | 4/1977 | Lakra | 123/447 |
| 4,176,832 | 12/1979 | Chadwick | 123/472 |
| 4,284,263 | 8/1981 | Newcomb | 251/129 |

FOREIGN PATENT DOCUMENTS

| | | | |
|---|---|---|---|
| 2094940 | 9/1982 | United Kingdom | 251/129 |
| 0608032 | 5/1978 | U.S.S.R. | 251/129 |

*Primary Examiner*—Francis K. Zugel
*Assistant Examiner*—G. Anderson
*Attorney, Agent, or Firm*—Cushman, Darby & Cushman

[57] ABSTRACT

A piezo-type valve with piezo-elements as a valve actuator. The piezo-elements are interposed by two freely movable pistons. A pressure chamber is formed on the outer side of one of the pistons to limit its outward movement. Thus, the substantial part of the expansion of the piezo-elements is transmitted to the other piston. The other piston is connected to a valve element. At least one flow port and a relief port are formed in the valve body. When voltage is applied to the piezo-elements, the at least one flow port and the relief port are communicated.

20 Claims, 4 Drawing Figures

PIEZO-TYPE VALVE

BACKGROUND OF THE INVENTION

1. Field of the Invention

The present invention relates to a piezotype valve which utilizes a plurality of piezo-elements as a valve actuator.

2. Description of the Prior Art

In diesel engines, it has been desired to control the fuel injection to the optimum pattern responsive to wide running conditions. This requires a control valve having high response and accurate valve lift. To obtain high response, it is known to utilize the electrostrictive property of piezo-elements to actuate the valve. The amount of electrostriction of piezo-elements, however, is very small. Therefore, it is difficult to construct a valve having accurate valve lift using such piezo-elements because of relative errors in the assembly process or heat strain of the valve components.

SUMMARY OF THE INVENTION

It is an object of the present invention to provide a piezo-type valve, free from the above difficulties and with high response and accurate valve lift.

It is another object of the present invention to provide a control valve which can be used in the fuel injection system of diesel engines to establish the desired fuel injection pattern.

These objects are attained by a piezo-type valve according to the present invention, comprising a valve body having a cylinder bore; first and second axially movable pistons inserted in the cylinder bore; a plurality of piezo-elements inserted in the cylinder bore between the pistons, the piezo-elements expanding upon application of voltage thereto to actuate the pistons; a means for delimiting a pressure chamber in the valve body at the outer side of the first piston so as to limit the axial outward movement of the first piston when the voltage is applied to the piezo-elements, whereby the substantial part of the expansion of the piezo-elements is transmitted to the second piston; a means for delimiting at least one flow port and a relief port in said valve body, each extending from the outside to inside; and a valve element operatively connected to the second piston so that the at least one flow port is connected to the relief port when the voltage is applied to the piezo-elements and so that the at least one flow port is disconnected from the relief port otherwise.

BRIEF DESCRIPTION OF THE DRAWINGS

Other features and advantages of the present invention will now be described in greater detail with reference to the preferred embodiments of the invention in connection with the attached drawings, wherein.

DESCRIPTION OF THE PREFERRED EMBODIMENT

Figure 1:
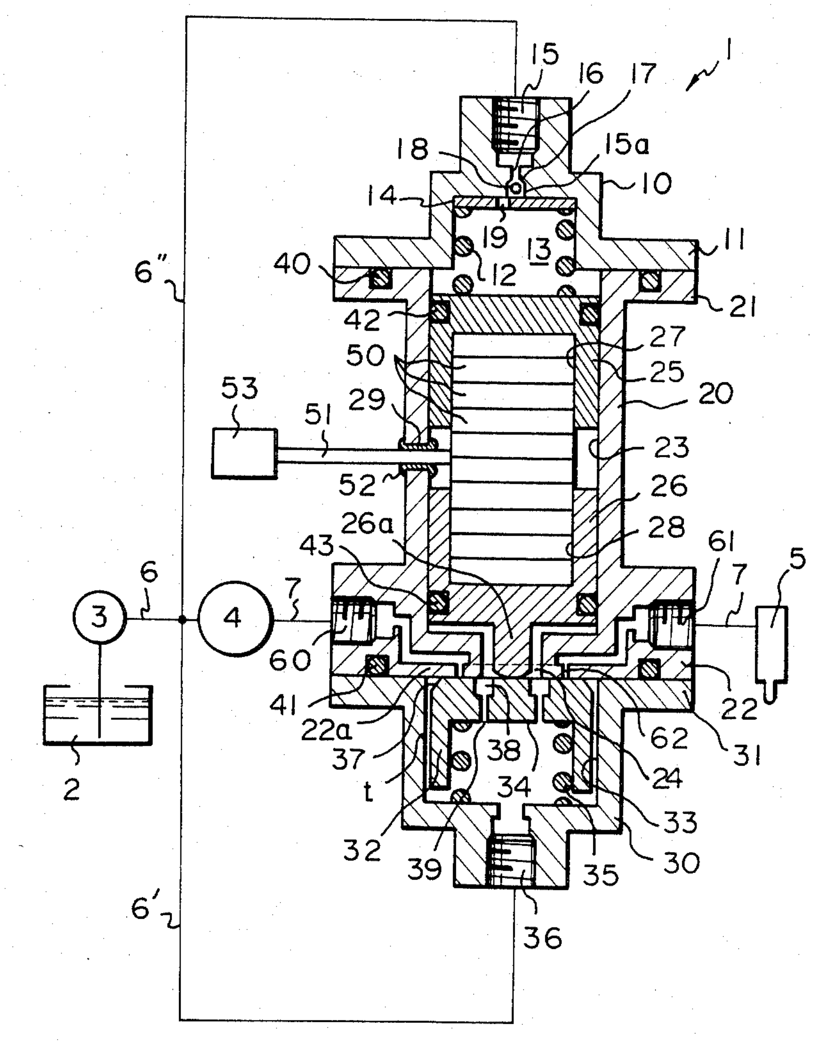
FIG. 1 is a section of a piezo-type valve according to an embodiment of the present invention, the valve being used in a fuel injection system of a diesel engine.

Referring first to FIG. 1, a piezo-type valve 1 according to the present invention is shown. The valve 1 is used as a control valve, or a relief valve, in the fuel injection system of the diesel engine. The system comprises a fuel tank 2, a feed pump 3, a fuel injection pump 4, the piezo-type valve 1, and a fuel injection nozzle 5. A low pressure fuel line 6 and a high pressure fuel line 7 connect these components.

The piezo-type valve 1 comprises an upper casing 10, a center casing 20 and a lower casing 30, aligned in series. The upper and center casings 10 and 20 have facing flanges 11 and 21, respectively, to fix them with each other by bolts (not shown). A seal ring 40 is arranged between the facing surfaces of the flanges 11 and 21. Similarly, the center and lower casings 20 and 30 are fixed by respective flanges 22 and 31, a seal ring 41 being arranged therebetween.

The center casing 20 has an axially extending through-bore. The bore comprises a first cylinder bore 23 open to the upper casing 10 and a small centrally arranged bore 24 open to the lower casing 30. Upper and lower pistons 25 and 26 are inserted in the first cylinder bore 23. Seal rings 42 and 43 are located between the corresponding pistons and the center casing 20. Each piston is recessed opposedly to each other as indicated by the numerals 27 and 28. A plurality of piezo-elements 50 stacked in a cylindrical form are inserted into the recesses 27 and 28 and into the space between the pistons 25 and 26. The center casing 20 has an opening 29 to pass a lead wire 51 which is connected to the piezo-elements 50 to apply the voltage. A grommet 52 is inserted in the opening 29. An electronic control unit 53 delivers the voltage.

The second piston 26 has a small projection *26a* which can extend through the small bore 24 and abut a valve element 32 which is inserted into a second cylinder bore 33 formed in the lower casing 30 with a certain clearance t on the order of 0.1 to 1 mm. The first cylinder bore 23, the small bore 24, and the second cylinder bore 33 are axially aligned and communicate with each other. The diameter of the second cylinder bore 33 in the lower casing 30 is greater than that of the small bore 24 in the center casing 20. Thus the center casing bottom wall *22a* projects inwardly around the small bore 24, annularly from the second cylinder bore 33 inner circumferential wall and also delimits the second cylinder bore 33. The bottom surface of the center casing bottom wall *22a* is flat and perpendicular to the axis of the center casing 20. The surface of the valve element 32, facing the bottom flat surface of the center casing bottom wall *22a*, is also flat.

The bottom of the valve element 32 is recessed, as indicated by the numeral 34. A second prestressed spring 35 biases the valve element 32 toward the second piston 26. A first prestressed spring 12 in a pressure chamber 13, described below, biases the first piston 25 toward the second piston 26. The spring force of the second spring 35 is greater than that of the first spring 12. Thus, unless force is applied to the valve element 32, the valve element 32 is seated on the flat bottom surface of the center casing bottom wall *22a*.

An inlet port 60 and an outlet port 61 are open to the flange 22 of the center casing 20 and extend inside the inwardly projecting bottom wall 22*a*. The ports 60 and 61 are interconnected by a ring groove 62 which is open to the bottom flat surface of the bottom wall 22*a*. A relief port 36 is provided in the bottom of the lower casing 30 to relieve the fuel in the second cylinder bore 33 to the low pressure fuel line 6 through a line 6'. To enable the fluid to pass through the valve element 32, the clearance t is provided between the valve element 32 and the second cylinder bore 33, and the valve element 32 is chamfered as indicated by the numeral 37. Further, the valve element 32 has a ring groove 38 which is open to the flat top surface and following ports 39 which are open to the back of the valve element 32.

As will be apparent from the fore-going description, the inlet and outlet ports 60 and 61 are connected to the relief port 36 when the valve element 32 is lifted, i.e., actuated, from the flat surface of the bottom wall 22*a* of the center casing 20 by applying voltage to the piezo-elements 50. The inlet and outlet ports 60 and 61 are disconnected from the relief port 36 when the valve element 32 is seated on the flat bottom surface of the center casing 20. For this purpose, the ring groove 62 of the center casing 20 does not overlap the ring groove 38 of the valve element 32. Preferably, the diameter of the ring groove 62 is greater than that of the ring groove 38. Also, preferably, the ring groove 38 partially overlaps the small bore 24 communicated with the first cylinder bore 23.

On the outer side of the first piston 25, the pressure chamber 13 is provided by the upper casing 10, center casing 20, and the first piston 25. A plate 14 is inserted at the top of the pressure chamber 13. The prestressed spring 12 is disposed between the plate 14 and the first piston 25 to bias the first piston toward the second piston 26 as well as to bias the plate 14 toward the top wall of the pressure chamber 13. A port 15 is provided on the top wall of the upper casing 10 to introduce the fluid, fuel in this embodiment, into the pressure chamber 13. The port has a restriction 16 to limit the fluid flow through the port 15. Under the restriction 16 and in the port 15, a check valve 17 comprising a ball 18 is disposed. The restriction 16 serves as a seat for the ball 18 in this embodiment. The diameter of the ball 18 is preferably less than one-tenth of that of the bore 23. The clearance between the ball 18 and its circumferential wall, measured either horizontally or vertically, is preferably less than 0.5 mm. The ball 18 is received by the plate 14 when it falls by gravity. The plate 14 has a through-holl 19 which is offset from the bottom portion 15*a* of the port 15. Thus, the hole 19 is never blocked by the ball 18. As the check valve 17 is disposed in the vertical portion of the port 15, no spring is needed. It is also possible, however, to dispose the port 15 or the valve 1 itself horizontally by adding spring means to return the ball 18.

In operation, when voltage is applied, the piezo-elements 50 expand to actuate both pistons in the axial direction. The first piston 25 starts to move outwardly, whereupon the fluid pressure in the pressure chamber 13 rises, causing the ball 18 to be seated on its valve seat, i.e., the restriction 16. As the fluid in the pressure chamber 13 is noncompressible, further outward movement of the first piston is limited. Thus the substantial part of the expansion of the piezo-elements 50 is transmitted to the second piston 26, which in turn actuates the valve element 32 to communicate the inlet and outlet ports 60 and 61 with the relief port 36. Therefore, the lift of the valve element 32 substantially corresponds to the value of the voltage applied to the piezo-elements 50. It is to be understood that the movable components of the piezo-type valve according to the present invention are free from the assembly errors and/or heat strain because no mechanical positioning is needed for the movable components, i.e., the original position of the valve element 32 is automatically determined by the static flat surface of the center casing wall and the positions of the other movable components are in turn determined in correspondence with the position of the valve element 32.

Figure 2:
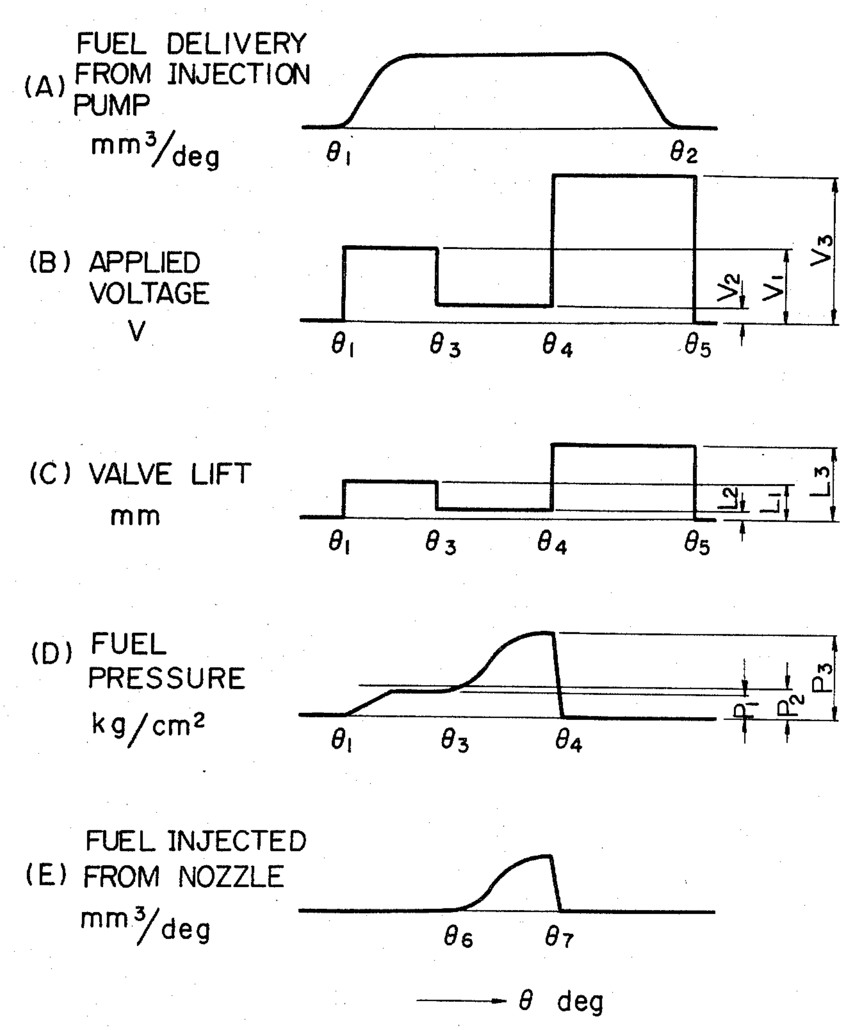
FIG. 2 is a diagram illustrating the operation of the valve in FIG. 1.

The operation of the piezo-type valve connected to the fuel injection system of the diesel engine in FIG. 1 is further described with reference to FIG. 2. The graph (A) in FIG. 2 shows the fuel delivery from the fuel injection pump 4 which starts fuel delivery at the angle $\theta_1$ and stops it at the angle $\theta_2$, after delivering fuel sufficiently beyond the needed amount. The graph (B) shows the voltage applied to the piezo-elements 50. The voltage $V_1$ is applied at the same angle $\theta_1$ where the fuel injection pump 4 starts the fuel delivery. The voltage is changed to $V_2$ at the angle $\theta_3$, changed to $V_3$ at the angle $\theta_4$, and then reduced to zero at the angle $\theta_5$, the angle $\theta_5$ being later than the angle $\theta_2$. The voltages applied are assumed to be in the relation $V_3 \geqq V_1$22 $V_2$. The valve element 32 is lifted from the bottom wall flat surface of the center casing 20, the lift being substantially proportional to the voltage level, as shown in the graph (C). The relation $L_3$24 $L_1$22 $L_2$ exists. When the valve element 32 is lifted, the fuel is relieved from the relief port 36. The amount of the relieved fuel corresponds to the valve lift. Therefore, the fuel pressure through the valve 1 changes as shown in the graph (D). It is assumed that the pressure $P_2$ corresponds to the fuel injection nozzle 5 opening pressure. The pressure $P_1$ is lower than the pressure $P_2$ and the pressure $P_3$ is higher than the pressure $P_2$. Thus, the fuel is injected from the nozzle 5 at the angle $\theta_6$, which is slightly later than the angle $\theta_3$, as shown in the graph (E). The fuel injection stops at the angle $\theta_7$, which is slightly later than the angle $\theta_4$, by relieving the remaining fuel. It is to be understood that the graph (E) in FIG. 2 shows only one example of the fuel injection pattern and that any desired pattern can be obtained by controlling the angles $\theta_3$ and $\theta_4$ and the applied voltage values. The fuel injection pump 4 alone can provide the distributing function and fuel pressurizing function, i.e., the conventional governer mechanism and timer can be omitted.

Figure 3:
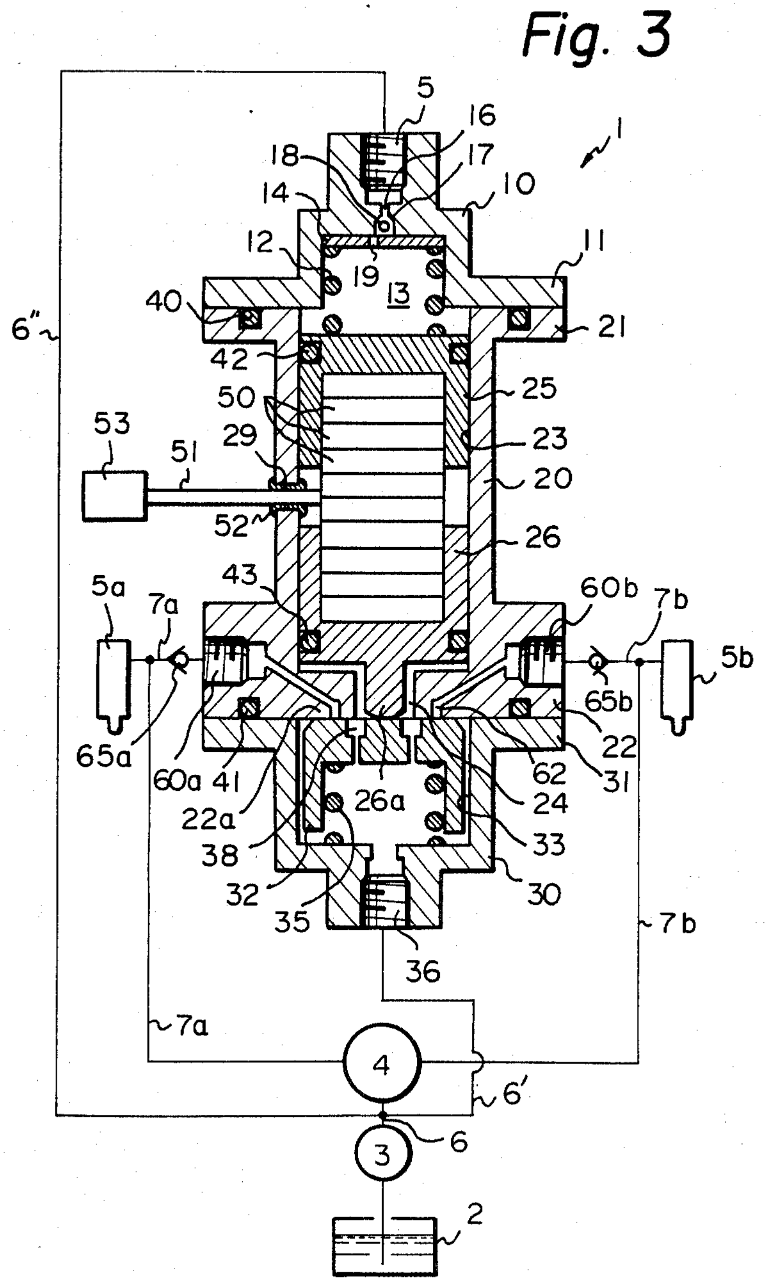
FIG. 3 is a section of a piezo-type valve according to another embodiment of the present invention, the valve being used in another fuel injection system of a diesel engine.

FIG. 3 shows another embodiment according to the present invention. The piezo-type valve 1 itself is substantially the same as that shown in FIG. 1. This embodiment differs from FIG. 1 in that the piezo-type valve 1 is connected to a fuel injection system of a diesel engine in a different manner. The flow ports 61 and 62 in FIG. 1 were connected in series to the high pressure fuel line 7 between the fuel injection nozzle 5. Thus, one piezo-type valve 1 was needed for each fuel injection nozzle. The ports were the inlet port 61 and the outlet port 62. The flow ports 60*a* and 60*b* in FIG. 3 are all inlet ports because a check valve 65*a* or 65*b* is disposed in the high pressure fuel line 7 before the respective port so as to prevent the fuel from outflowing. Though only two ports 60*a* and 60*b* are shown in the drawing, the number of ports can be equal to that of the cylinders, i.e., the number of nozzles 5*a* and 5*b*, of the engine. Each port 60*a* or 60*b* is connected to the high pressure fuel line 7 between the fuel injection pump 4 and a respective fuel infection nozzle 5*a* or 5*b*.

When the fuel injection pump 4 delivers the fuel to one of the fuel injection nozzles 5*a* and 5*b*, for example, to the nozzle 5*a*, the fuel pressure rises in the high pressure fuel line 7*a*, the fuel being not delivered to the other line 7*b*. The pressurized fuel goes to the nozzle 5*a* and the valve 1. If the valve 1 is operated in such a manner as described in FIGS. 1 and 2, the fuel pressure is first lowered below the nozzle opening pressure $P_2$ by applying the voltage $V_1$ to the piezo-elements 50, relieving the fuel from the relief port 36. By changing the voltage, the fuel pressure rises over the nozzle opening pressure $P_2$, and the fuel is then injected from the nozzle 5*a*.

Figure 4:
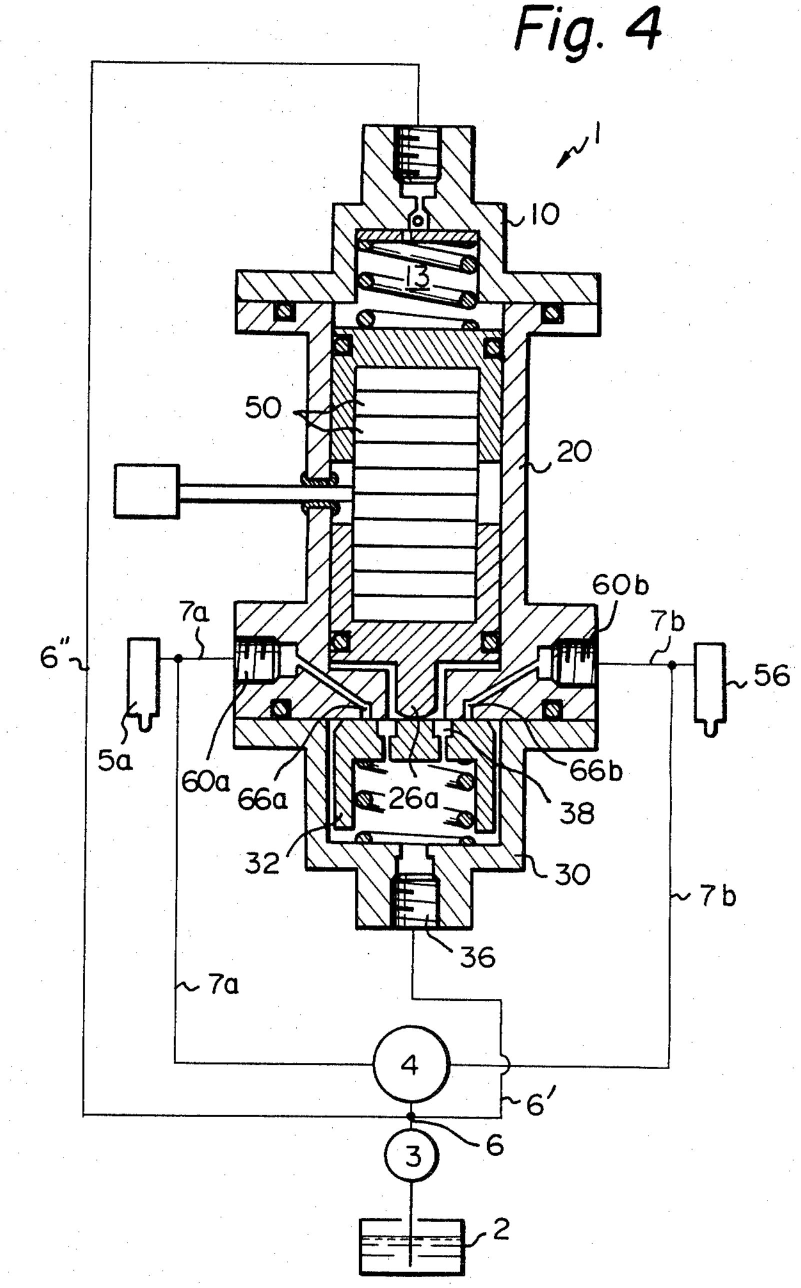
FIG. 4 is a section of a piezo-type valve according to still another embodiment of the present invention, the associated fuel injection system being similar to that of FIG. 3.

FIG. 4 shows still another embodiment of the present invention. It differs from FIG. 3 in that the check valves 65*a* and 65*b* and the ring groove 62 are omitted. Instead, the ports 60*a* and 60*b* are open to the above-mentioned flat surface, independently of each other, by a port 66*a* or 66*b*. The operation of the piezo-type valve in FIG. 4 will be apparent from the foregoing description.

It will be clear to those skilled in the art that various modifications can be achieved within the spirit and the scope of the present invention. For example, the flow port means can be widely varied and the valve element can be integrated with the second piston. Also, the piezo-type valve according to the invention is not intended for use only in fuel injection systems of diesel engines. Such modification are covered by the appended claims.

We claim:

1. A piezo-type valve comprising:

a valve body defined by valve casing sections having a cylinder bore;

first and second axially movable pistons inserted in said cylinder bore;

a plurality of piezo-elements inserted in said cylinder bore between said pistons, said piezo-elements expanding upon application of voltage thereto to actuate said pistons;

means for delimiting a pressure chamber in said valve body at the outer side of said first piston so as to limit the axial outward movement of said first piston when the voltage is applied to said piezo-elements, whereby the substantial part of the expansion of said piezo-elements is transmitted to said second piston;

means for delimiting at least one flow port and a relief port in said valve body, each extending through said valve body at the outer side of said second piston; and a valve element operatively connected to said second piston so that said at least one flow port is connected to said relief port when the voltage applied to said piezo-elements causes the second piston to move outwardly and so that said at least one flow port is disconnected from said relief port otherwise.

2. A piezo-type valve according to claim 1, wherein a further port is formed in said valve body for introducing the fluid into said pressure chamber, said further port having a restriction to limit the fluid outflowing from said pressure chamber when the voltage applied to said piezo-elements causes the pistons to move outwardly.

3. A piezo-type valve according to claim 2, wherein a check valve is disposed in said further port to limit the fluid outflowing from said pressure chamber when the voltage applied to said piezo-elements causes the pistons to move outwardly.

4. A piezo-type valve according to claim 3, wherein said further port extends axially of said bore and chamber, said check valve being disposed in said vertically extending portion of said further port.

5. A piezo-type valve according to claim 4, wherein said check valve comprises a ball and its seat on the upper side from said ball and a plate having a through-hole is disposed in said pressure chamber to receive said ball falling by gravity, said through-hole and said vertical portion of said further port being communicatingly offset.

6. A piezo-type valve according to claim 1, wherein a second cylinder bore is formed in said valve body adjacent to said cylinder bore on said second piston side for inserting said valve element, said cylinder bore and said second cylinder bore being communicated with each other through a third bore and the three bores being axially aligned.

7. A piezo-type valve according to claim 6, wherein the diameter of said third bore is smaller than that of said second cylinder bore and said second piston has an axial projection toward said valve element, said projection being able to extend through said third bore and abut said valve element.

8. A piezo-type valve according to claim 7, wherein the surface of said valve element on said second piston side is flat and substantially perpendicular to the axis of said cylinder bore and the facing surface of said valve body wall delimiting said second cylinder bore is also flat and perpendicular to the same axis.

9. A piezo-type valve according to claim 8, wherein a first prestressed spring biases said first piston toward said second piston and a second prestressed spring biases said valve element toward said second piston, the spring force of said second spring being greater than that of said first spring, said valve element thus seated on said facing flat surface delimiting said second cylinder bore when voltage is not applied to said piezo-elements and thus lifted from said facing flat surface when said voltage applied causes the pistons to move outwardly.

10. A piezo-type valve according to claim 9, wherein said at least one flow port is open to said second cylinder bore at said facing flat surface and said relief port is also open to said second cylinder bore.

11. A piezo-type valve according claim 10, including more than one flow port and said flow ports communicate with each other inside said valve body before they reach said facing flat surface openings.

12. A piezo-type valve according to claim 10, wherein, when more than one, said flow ports are independently open to said facing flat surface and prevented from communicating with each other before they reach said flat surface openings.

13. A piezo-type valve according to claim 10, wherein said valve element is inserted in said second cylinder bore, with a certain clearance and said at least one port the opening of is formed in said facing flat surface in the range where said opening overlaps said flat surface of said valve element, the fluid thus able to flow from said at least one port to said relief port when voltage is applied to said piezo-elements causes the pistons to move outwardly.

14. A piezo-type valve according to claim 10, wherein said valve element has a port extending from said flat surface to the opposite end surface and the opening of said at least one port is formed in said facing flat surface in the range where said opening overlaps said flat surface of said valve element, the fluid thus able to flow from said at least one port to said relief port when said voltage applied to said piezo-elements causes the pistons to move outwardly.

15. A piezo-type valve according to claim 1, wherein said valve is used as a relief valve in a fuel injection system of a diesel engine and wherein the number of said at least one flow port is two, said two flow ports being communicated with each other and connected in series to a high pressure fuel line between a fuel injection pump and a fuel injection nozzle, said relief port being connected to a low pressure fuel line upstream of the fuel injection pump.

16. A piezo-type valve according to claim 15, wherein said pressure chamber is connected to said low pressure fuel line through a restriction.

17. A piezo-type valve according to claim 1, wherein said valve is used as a relief valve in a fuel injection system of a diesel engine and wherein the number of said at least one flow port corresponds to that of the cylinders of the engine, each of said flow ports not being communicated with each other and connected to a high pressure fuel line between a fuel injection pump and respective fuel injection nozzle, said relief port being connected to a low pressure fuel line upstream of the fuel injection pump.

18. A piezo-type valve according to claim 17, wherein said pressure chamber is connected to said low pressure fuel line through a restriction.

19. A piezo-type valve according to claim 1, wherein said valve is used as a relief valve in a fuel injection system of a diesel engine and wherein the number of said at least one flow port corresponds to that of the cylinders of the engine, each of said flow ports being communicated with each other and connected to a high pressure fuel line between a fuel injection pump and respective fuel injection nozzle, a check valve being associated with each of said flow ports to prevent the fluid from reversely flowing from the piezo-type valve to the respective high pressure fuel line, said relief port being connected to a low pressure fuel line upstream of the fuel injection pump.

20. A piezo-type valve according to claim 19, wherein said pressure chamber is connected to said low pressure fuel line.

* * * * *